United States Patent
Peng (10) Patent No.: US 9,516,093 B2
(45) Date of Patent: Dec. 6, 2016

(54) DATA SHARING METHODS AND PORTABLE TERMINALS

(75) Inventor: Gang Peng, Beijing (CN)

(73) Assignees: Lenovo (Beijing) Limited, Beijing (CN); Beijing Lenovo Software Ltd., Beijing (CN)

(*) Notice: Subject to any disclaimer, the term of this patent is extended or adjusted under 35 U.S.C. 154(b) by 344 days.

(21) Appl. No.: 13/637,044

(22) PCT Filed: Mar. 18, 2011

(86) PCT No.: PCT/CN2011/000449
§ 371 (c)(1),
(2), (4) Date: Sep. 25, 2012

(87) PCT Pub. No.: WO2011/116626
PCT Pub. Date: Sep. 29, 2011

(65) Prior Publication Data
US 2013/0018977 A1    Jan. 17, 2013

(30) Foreign Application Priority Data
Mar. 26, 2010 (CN) .......................... 2010 1 0135339

(51) Int. Cl.
G06F 15/167    (2006.01)
H04L 29/08     (2006.01)
H04L 29/14     (2006.01)

(52) U.S. Cl.
CPC ............... *H04L 67/06* (2013.01); *H04L 69/40* (2013.01)

(58) Field of Classification Search
CPC .............................. H04L 67/1002; H04L 69/40
(Continued)

(56) References Cited

U.S. PATENT DOCUMENTS 8,326,805 B1 * 12/2012 Arous et al. .................. 707/661
2006/0062219 A1 * 3/2006 Ookubo .......................... 370/392
(Continued)

FOREIGN PATENT DOCUMENTS

| CN | 1696902 A | 11/2005 |
|---|---|---|
| CN | 1755636 A | 4/2006 |
| CN | 101211358 A | 7/2008 |

OTHER PUBLICATIONS

International Search Report of the State Intellectual Property Office in Application No. PCT/CN2011/000449, dated Jun. 30, 2011.

*Primary Examiner* — Hua Fan
(74) *Attorney, Agent, or Firm* — Kinney & Lange, P.A.

(57) ABSTRACT

A data sharing method and a portable terminal are provided. The portable terminal is a first terminal having a first system and a second system which have a capability of operating a shared storage area. The method comprises: starting transmitting a file in the shared storage area to a second terminal by the first system; acquiring upload information of the file by the second system, when detecting that the first system fulfills a predetermined condition, during the transmission of the file in the shared storage area to the second terminal by the first system; and continuing the transmission of the file to the second terminal by the second system in accordance with the upload information. In the transmission of shared data according to the embodiments of the present disclosure, due to the two-system hybrid architecture of the terminal, one of the two systems may continue the transmission of the shared data if the transmission is interrupted by shut down or fault of the other one of the two systems, thereby the user experience in transmitting the shared data may be improved.

11 Claims, 4 Drawing Sheets

(58) Field of Classification Search
USPC ......... 709/213, 214, 216, 217, 218; 711/148
See application file for complete search history.

(56) References Cited

U.S. PATENT DOCUMENTS

| | | |
|---|---|---|
| 2006/0070069 A1 | 3/2006 | Aguilar, Jr. et al. |
| 2006/0264239 A1* | 11/2006 | Tominaga .................... 455/558 |
| 2007/0174410 A1* | 7/2007 | Croft et al. ................... 709/208 |
| 2007/0180447 A1* | 8/2007 | Mazzaferri et al. ............. 718/1 |
| 2008/0043696 A1* | 2/2008 | Yang et al. ................... 370/341 |
| 2008/0045189 A1* | 2/2008 | Kim et al. ................ 455/414.2 |
| 2011/0010258 A1* | 1/2011 | Chavez et al. ............... 705/26.1 |

* cited by examiner

DATA SHARING METHODS AND PORTABLE TERMINALS

TECHNICAL FIELD

The present disclosure relates to communication technologies, and more particularly, to data sharing methods and portable terminals.

BACKGROUND

A terminal having a hybrid system architecture, taking PC (Personal Computer) as an example, is a PC implemented by embedding into a conventional PC having only one system at least one other system. The different systems may cooperate with each other to render their respective advantages. A conventional PC having a hybrid system architecture generally has a master system (for example, X86) and a slave system (for example, ARM) integrated therein, and a keyboard, a network card, a display screen, a storage device, an Audio, and the like may be shared between the master system and the slave system. The master system has a characteristic of powerful performance and high power consumption, while the slave system has a characteristic of relatively weak performance and low power consumption.

In the prior art, data is transmitted and shared between portable terminals by means of an application software. For example, in a case that a terminal A and a terminal B both have an instant communication tool installed therein and add each other as a friend, data is transmitted, after the terminals A and B access a network, over the network in order to be shared. When studying the prior art, the inventor found that when the system is shut down or has a fault during transmission, the transmission of data will be interrupted and thus the user experience in data sharing will be degraded.

SUMMARY

An object of the present disclosure is to provide a data sharing method and a portable terminal to solve the problem of an increased power consumption of the system and a poor user experience due to the data sharing by the terminal of hybrid system architecture based on only the X86 system in the prior art.

In order to solve the above technical problem, following technical solutions are provided by embodiments of the present disclosure.

A data sharing method applicable in a portable terminal having a first system and a second system which have a capability of operating a shared storage area is provided comprising:

transmitting, by the first system, a file in the shared storage area to a second terminal;

acquiring, by the second system, upload information of the file, when detecting that the first system fulfills a predetermined condition, during the transmission of the file in the shared storage area to the second terminal by the first system; and continuing, by the second system, the transmission of the file to the second terminal in accordance with the upload information.

Detecting that the first system fulfills the predetermined condition comprises:

detecting, by the first system, that only the operation of transmitting the file to the second is currently performed; or detecting, by the second system, that the first system enters an inactive state; or detecting, by the first system, that a transmission fault occurs during the transmission of the file.

The first system is located within a first casing of the first terminal, and the second system and the shared storage area are located within a second casing of the first terminal; and detecting that the first system fulfills the predetermined condition comprises: detecting, by the second system, a signal indicating that the first casing containing the first system is separated from the second casing.

Before transmitting the file in the shared storage area to the second terminal by the first system, the data sharing method further comprises: associating the first terminal with the second terminal by starting a sharing client software.

Before transmitting the file in the shared storage area to the second terminal by the first system, the data sharing method further comprises:

marking the file, by the first system, in accordance with a user-input sharing command; and saving the file and mark information into the shared storage area, wherein the mark information includes the partition, catalogue, and file name of the file in the shared storage area as well as an identification of the second terminal.

Transmitting the file in the shared storage area to the second terminal by the first system comprises:

reading, by the first system, the mark information in the shared storage area; and acquiring the file in accordance with the mark information, and transmitting the file to the second terminal in accordance with the identification of the second terminal.

When detecting that the first system fulfills the predetermined condition, the data sharing method further comprises:

recording, by the first system, the upload information of the file into the shared storage area, wherein the upload information includes the progress and amount of upload.

In case of the second terminal comprises a first system, a second system, and a shared storage area, the data sharing method further comprises:

storing, by the first system, a received shared data into the shared storage area of the second terminal, when the first system of the second terminal is at an active state; and storing, by the second system, the received shared data into the shared storage area of the second terminal, when the first system of the second terminal exits the active state A portable terminal comprising a first system and a second system which have a capability of operating a shared storage area is provided, wherein:

the first system comprises a first transmission unit configured to transmit a file in the shared storage area to a second terminal;

at least one of the first and second system comprises a detecting unit configured to detect if the first system fulfills a predetermined condition, during the transmission of the file in the shared storage area to the second terminal by the first system; and the second system comprises an acquisition unit configured to acquire upload information of the file when the detecting unit detects that the first system fulfills the predetermined condition, and a second transmission unit configured to continue the transmission of the file to the second terminal in accordance with the upload information.

The first system further comprises:

a marking unit configured to mark the file in accordance with a sharing command user inputted; and a saving unit configured to save the file and mark information into the shared storage area, wherein the mark information includes the partition, catalogue, and file name of the file in the shared storage area as well as an identification of the second terminal.

The first transmission unit comprises:

a mark reading unit configured to read the mark information in the shared storage area; and a file sending unit configured to acquire the file in accordance with the mark information, and transmitting the file to the second terminal in accordance with the identification of the second terminal.

The first system further comprises a recording unit configured to record the upload information of the file into the shared storage area when the detecting unit detects that the first system fulfills the predetermined condition.

In view of the above technical solutions provided by embodiments of the present disclosure, the embodiments of the present disclosure is applicable in a portable terminal having a first system and a second system which have a capability of operating a shared storage area. During the transmission of the file in the shared storage area to the second terminal by the first system, when it is detected that the first system fulfills a predetermined condition, the second system acquires upload information of the file and continues the transmission of the file to the second terminal in accordance with the uploaded information.

DETAILED DESCRIPTION OF THE PREFERRED EMBODIMENTS

Among the following embodiments of the present disclosure, some embodiments provide data sharing methods, and some other embodiments provide portable terminals. In the embodiments of the present disclosure, a portable terminal for transmitting shared data structurally includes a first system, a second system, and a shared storage area. The first system has a first hardware system on which a first operating system may run, and the second system has a second hardware system on which a second operating system may run. Further, the processing capability of the first hardware system is greater than that of the second hardware system. For example, the first hardware system may be a hardware platform of X86, and the second hardware system may be a hardware platform of ARM.

In the following, the particular embodiments will be further detailed with reference to the figures, such that the technical solutions in the embodiments of the present disclosure may be better understood by those skilled in the art and the above objects, features and advantages of the present application can become more apparent.

Figure 1:
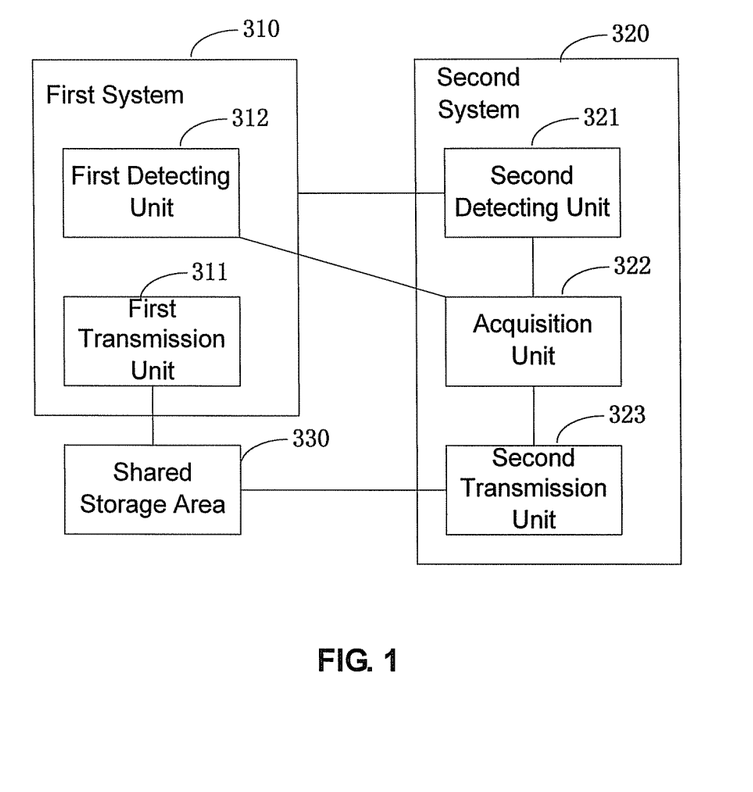
FIG. 1 is a block diagram showing a portable terminal according to an embodiment of the present disclosure.

An embodiment of the present disclosure relates to a portable terminal. FIG. 1 is a block diagram showing the portable terminal according to an embodiment of the present disclosure. With reference to FIG. 1, the portable terminal includes a first system 310, a second system 320, and a shared storage area 330. The first system 310 has a first hardware system 310 on which a first operating system may run, and the second system 320 has a second hardware system on which a second operating system may run. Further, the processing capability of the first hardware system is greater than that of the second hardware system. For example, the first hardware system may be a hardware platform of X86, and the second hardware system may be a hardware platform of ARM.

According to the embodiment of the present disclosure, the first system 310 includes a first transmission unit 311 configured to transmit a file in the shared storage area to a second terminal. At least one of the first system 310 and the second system 320 includes a detecting unit configured to detect if the first system 310 fulfills a predetermined condition, during the transmission of the file in the shared storage area 330 to the second terminal by the first system 310. For sake of illustrating, the detecting unit is shown in both the first system 310 and the second system 320, specifically as a first detecting unit 312 in the first system 310 and as a second detecting unit 321 in the second system 320.

According to the embodiment of the present disclosure, the second system 320 includes an acquisition unit 322 configured to acquire upload information of the file when the detecting unit detects that the first system fulfills the predetermined condition, and a second transmission unit 323 configured to continue the transmission of the file to the second terminal in accordance with the upload information.

It is determined that the first system 310 fulfills the predetermined condition, when the first detecting unit 312 detects that only the operation of transmitting the file to the second is currently performed by the first system 310; or it is determined that the first system 310 fulfills the predetermined condition, when the second detecting unit 321 detects that the first system 310 enters an inactive state; or it is determined that the first system 310 fulfills the predetermined condition, when the first detecting unit 312 detects that a transmission fault occurs during the transmission of the file by the first system 310.

If the first system 310 and the system 320 in the portable terminal may be separated from each other wherein the first system 310 is located within a first casing of the first terminal and the second system 320 and the shared storage area 330 are located within a second casing of the first terminal, it is determined that the first system 310 fulfills the predetermined condition when a signal indicating that the first casing containing the first system 310 is separated from the second casing is detected by the second detecting unit 321.

Figure 2:
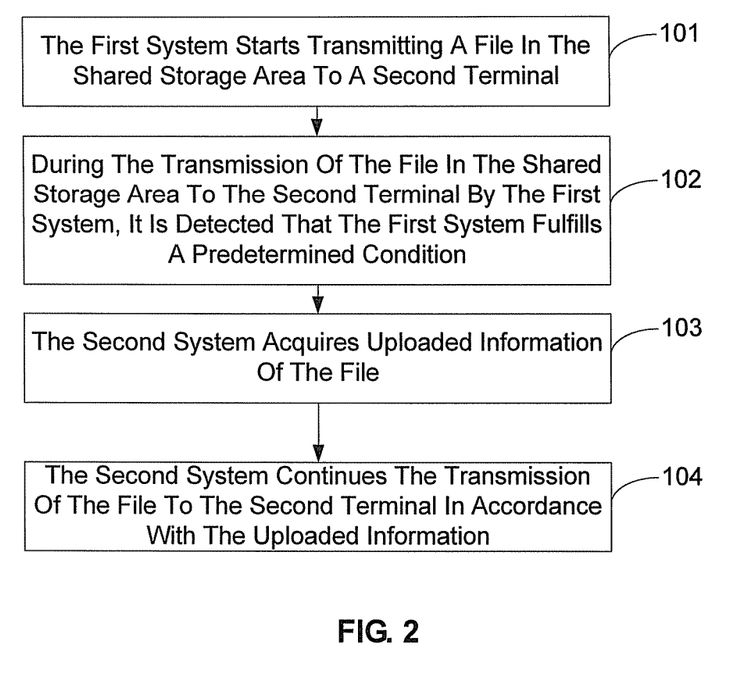
FIG. 2 is a flowchart illustrating a data sharing method according to the embodiment of the present disclosure.

FIG. 2 is a flowchart illustrating a data sharing method according to the embodiment of the present disclosure.

At step 101, the first transmission unit in the first system 310 start transmitting the file in the shared storage area 330 to a second terminal.

Specifically, the first system 310 marks the file in accordance with a sharing command user inputted and saves the file and mark information into the shared storage area. The mark information includes the partition, catalogue, and file name of the file in the shared storage area 330 as well as an identification of the second terminal. When transmitting the shared file, the first system reads the mark information in the shared storage area, acquires the file in accordance with mark information, and transmits the file to the second terminal in accordance with the identification of the second terminal.

At step 102, it is detected that the first system 310 fulfills a predetermined condition, during the transmission of the file in the shared storage area 330 to the second terminal by the first system 310.

Specifically, the detecting that the first system 310 fulfills a predetermined condition may include: if the first detecting unit 312 of the first system 310 detects that only the operation of transmitting the file to the second is currently performed, or if the second detecting unit 321 of the second system 320 detects that the first system 310 enters an inactive state; or if the first system 310 detects that a transmission fault occurs during the transmission of the file.

In addition, if the first system 310 and the system 320 in the portable terminal may be separated from each other (for example, the first system 310 is located within a first casing of the first terminal and the second system 320 and the shared storage area 330 are located within a second casing of the first terminal), it is determined that the first system 310 fulfills the predetermined condition if a signal indicating that the first casing containing the first system 310 is separated from the second casing is detected by the second detecting unit 321.

At step 103, the acquisition unit 322 of the second system 320 acquires upload information of the file.

Specifically, if it is detected that the first system 310 fulfills the predetermined condition, the first system 310 records the upload information of the file, which includes the progress and amount of upload, into the shared storage area 330, and the acquisition unit 322 of the second system 320 acquires upload information of the file from the shared storage area 330 in order to continue the transmission of the file.

At step 104, the second transmission unit 323 of the second system 320 continues the transmission of the file to the second terminal in accordance with the upload information.

Figure 3:
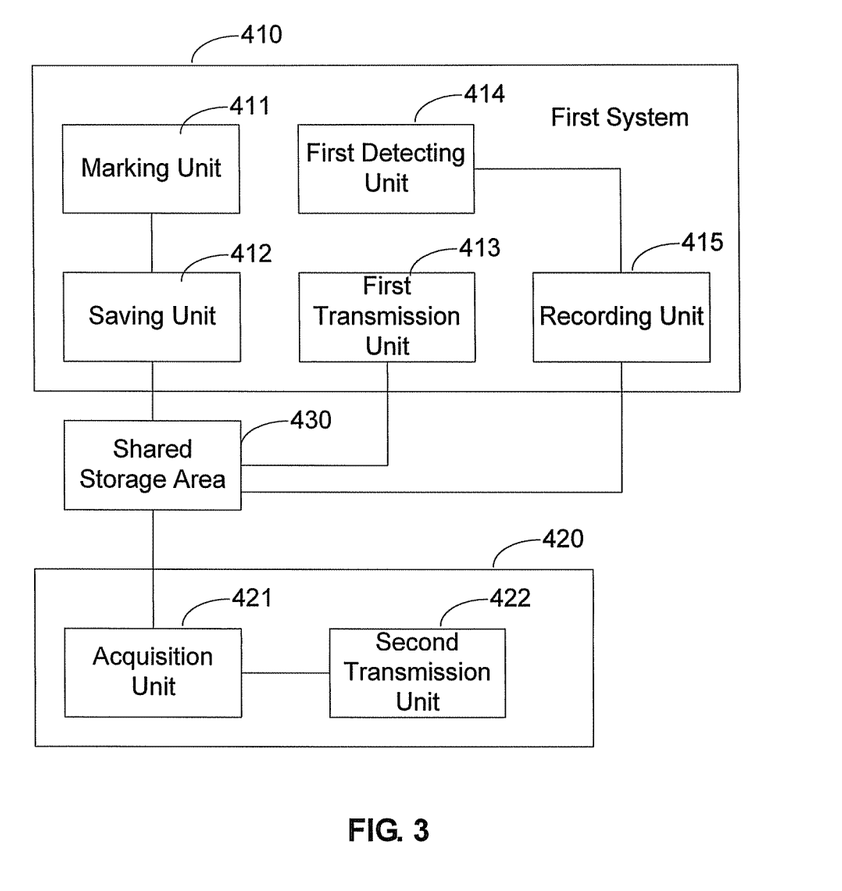
FIG. 3 is a block diagram showing a portable terminal according to another embodiment of the present disclosure.

FIG. 3 is a block diagram showing a portable terminal according to another embodiment of the present disclosure. As shown in FIG. 3, the portable terminal includes a first system 410, a second system 420, and a shared storage area 430. The first system 410 has a first hardware system 410 on which a first operating system may run, and the second system 420 has a second hardware system on which a second operating system may run. Further, the processing capability of the first hardware system is greater than that of the second hardware system. For example, the first hardware system may be a hardware platform of X86, and the second hardware system may be a hardware platform of ARM.

According to the embodiment of the present disclosure, the first system 410 includes a marking unit 411 configured to mark a file in accordance with a sharing command user inputted; and a saving unit 412 configured to save the file and mark information into the shared storage area 430, wherein the mark information includes the partition, catalogue, and file name of the file in the shared storage area 430 as well as an identification of the second terminal.

The first system 410 further includes a first transmission unit 413 configured to transmit the file in the shared storage area 430 to a second terminal; a first detecting unit 414 configured to detect if the first system 410 fulfills a predetermined condition, during the transmission of the file in the shared storage area 430 to the second terminal by the first system 410; and a recording unit 415 configured to record the upload information of the file into the shared storage area 430 when the first detecting unit 414 detects that the first system 410 fulfills the predetermined condition, wherein the upload information includes the progress and amount of upload.

According to the embodiment of the present disclosure, the second system 420 includes an acquisition unit 421 configured to acquire uploaded information of the file, and a second transmission unit 422 configured to continue the transmission of the file to the second terminal in accordance with the upload information.

In particular, the first transmission unit 413 includes (not shown in FIG. 3) a mark reading unit configured to read the mark information in the shared storage area; and a file sending unit configured to acquire the file in accordance with the mark information, and transmitting the file to the second terminal in accordance with the identification of the second terminal.

For sake of illustrating, only the first detecting unit of the first 410 is shown for the above embodiments. In practice, the second system 410 may also to includes a second detecting unit. In other words, at least one of the first and second systems may include a detecting unit configured to detect if the first system fulfills the predetermined condition.

Figure 4:
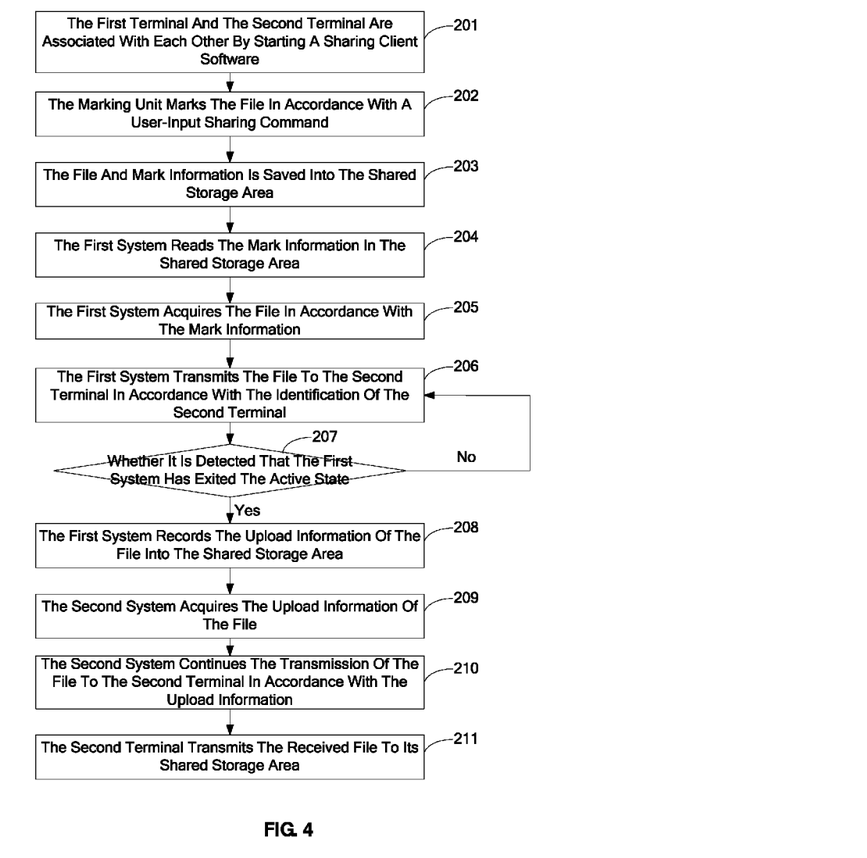
FIG. 4 is a flowchart illustrating a data sharing method according to the another embodiment of the present disclosure.

FIG. 4 is a flowchart illustrating a data sharing method according to the embodiment of the present disclosure. A process of uploading shared data from the first terminal to the second terminal will be described below based on the above described portable of hybrid system architecture.

At step 201, the first terminal and the second terminal are associated with each other by starting a sharing client software.

At step 202, the marking unit 411 marks the file in accordance with a sharing command user inputted.

At step 203, the saving unit 412 saves the file and mark information into the shared storage area 430.

The mark information includes the partition, catalogue, and file name of the file in the shared storage area 430 as well as an identification of the second terminal.

At step 204, the first transmission unit 413 of the first system 410 reads the mark information in the shared storage area 430.

At step 205, the first transmission unit 413 of the first system 410 acquires the file in accordance with the mark information.

At step 206, the first system 410 transmits the file to the second terminal in accordance with the identification of the second terminal.

In the present embodiment, the first system 410 of the first terminal sends to the second terminal a request for uploading the file in accordance with the identification of the second terminal after acquiring the file in accordance with the mark information, and then transmits the file to the second terminal over a network after receiving from the second terminal a feedback information indicating agreement of receiving. This is because the first terminal and the second terminal are associated with each other by starting a sharing client software.

In addition, the first terminal may transmit the file to a mail server corresponding to the mail address of the second terminal through the first system 410 for example by using the mail address of a second user of the second terminal which is known by a first user of the first terminal, if the first terminal and the second terminal are not associated with each other by the sharing client software, i.e. the first terminal and the second terminal cannot communicate with each other over the network. At this point, the first system 410 of the first terminal will transmit the file to the mail server corresponding to the second terminal over the network as long as it is detected that the first system 410 fulfills the predetermined condition.

In the case of a first terminal having the first system 410 and the second system 420, when the first system 410 fails in the transmission of the shared file, the transmission will be continued by the second system 420, irrespective of whether the first and second terminals are interacting with each other on line or not.

At step 207, it is determined whether the first system 410 exits the active state. If so, the process proceeds to step 208; otherwise, returns to step 206.

At step 208, the recording unit 415 of the first system 410 records the upload information of the file into the shared storage area 430.

The upload information of the file recorded by the first system 410 includes the progress and amount of upload, such that the second system 420 may continue the transmission of the file in accordance with the upload information.

At step 209, the acquisition unit 421 of the second system 420 acquires the upload information of the file.

At step 210, the second transmission unit 422 of the second system 420 continues the transmission of the file to the second terminal in accordance with the upload information.

At step 211, the second terminal transmits the received file to its shared storage area 430, and the process ends.

In the present embodiment, assuming that the second terminal has the same structure as the first terminal, i.e. the second terminal also includes a first system, a second system, and a shared storage area.

The received shared data is stored into the shared storage area of the second terminal by the first system when the first system of the second terminal is in an active state; and the received shared data is stored into the shared storage area of the second terminal by the second system when the first system of the second terminal exits the active state.

The process of sharing data in the embodiment of the present disclosure will be described below by way of an application example. Assume that the portable terminal of the present disclosure includes a master system X86 and a second system ARM, and that a picture file K is shared by a user A of a terminal 1 with a user B of a terminal 2, wherein the terminal 1 includes a sharing hard disk 1 and the terminal 2 includes a sharing hard disk 2.

Each of the terminal 1 used by user A and the terminal 2 used by user B has instant communication software thereon, and has a unique instant communication number for identifying different users. The terminals 1 and 2 add each other as friend by using the instant communication software. Accordingly an interconnection between the terminal 1 and terminal 2 is established via the network when the terminals 1 and 2 startup their instant communication software. The interconnection may be implemented in a wired or wireless manner, and each of the X86 and ARM systems for each of the terminals 1 and 2 may support the instant communication software.

Initially, each of the X86 and ARM systems for each of the terminals 1 and 2 is at an active state. At this time, in case of user A wants to share the picture file K stored in the terminal 1 with user B, user A may select the picture file K by using the right key of a mouse and mark it as "to be shared with user B." After the sharing command from user A is received by the X86 system of the terminal 1, the X86 system records the partition, catalogue, and file name of the picture file K in the shared hard disk 1 as well as the instant communication number of the user B to be shared with, if the picture file K is stored in the shared hard disk 1; or transmits the picture file K into the shared hard disk 1 and then records the partition, catalogue, and file name of the picture file K in the shared hard disk 1 as well as the instantaneous communication number of the user B to be shared with, if the picture file K is stored in a dedicated hard disk of the X86 system.

A request for sharing the picture file K is sent from the X86 system of the terminal 1 to the terminal 2 which may save a receiving strategy preset by user B therein. For example, the receiving strategy may be to receive the file as default when the request for transmitting the shared file; or to determine whether to receive the file by user B when the request for transmitting the shared file. The receiving strategy may be configured as desired and is not limited to the embodiments of the present disclosure.

In case of the other applications on the terminal 1 have been shut down during the transmission of the picture file K to the terminal 2 by the X86 system and at this time the X86 system of the terminal is ready to enter a sleep state or shut down state, the ARM system of the terminal 1 may determine whether the X86 system is intended to exit the active state by detecting the electrical state of a hardware related to the X86 system. The X86 system of the terminal 1 will save into the shared hard disk 1 the upload information of the picture file K being uploaded. The upload information may include the size of the uploaded picture file K, the rate at which the picture file K is uploaded, duration of uploading the picture file K, and the like. After the upload information is saved, the X86 system of the terminal 1 may exit the active state. At this time, the ARM system may detect that the X86 has exit the active state. Accordingly, the ARM system reads the upload information of the picture file K from the shared hard disk 1 while running the instantaneous communication software, and is directed to the transmission interrupt point of the picture file K according to the uploading progress of the picture file K in the upload information. From the transmission interrupt point, the ARM system continues the transmission of the picture file K to the terminal 2.

On the terminal 2 side, since the instantaneous communication may be implemented with the X86 system or the ARM system, the terminal 2 may receive the picture file K by running the X86 system or by running only the ARM system.

In the above embodiments, when the X86 system of the terminal 1 exits the active state during the transmission of the picture file K, the transmission of the picture file K will be continued by the ARM system, in order to ensure a seamless transmission of the picture file K and enhance the user experience. In addition, if the terminal is not required to perform any other operation at initial instant and only the ARM is startup, it is also possible to transmit the picture file K directly by the ARM system through running the instantaneous communication software. In other words, the intention of embodiments of the present disclosure resides in that the transmission of the shared data may be implemented by the ARM system having a lower consumption, independent of the X86 system.

In view of the above description, the embodiments of the present disclosure are applicable in a first terminal having a first system and a second system which have a capability of operating a shared storage area. During the transmission of the file in the shared storage area to the second terminal by the first system, when it is detected that the first system fulfills a predetermined condition, the second system acquires upload information of the file and continue the transmission of the file to the second terminal in accordance with the upload information. In the transmission of shared data according to the embodiments of the present disclosure, due to the two-system hybrid architecture of the terminal, one of the two systems may continue the transmission of the shared data if the transmission is interrupted by shut down or fault of the other one of the two systems, thereby the user experience in transmitting the shared data may be improved. In addition, when the system having higher power consumption is only for transmitting the shared data, the overall power consumption of the terminal in transmitting the shared data may be decreased by switching to the system having lower power consumption to continue the transmission of the shared data and shutting down the system having higher power consumption.

It will be appreciated by those skilled in the art that the embodiments of the present disclosure may be implemented by software combined with a necessary general hardware platform. For this reason, the embodiments of the present disclosure substantially (in other words, the portions having contribution to the prior art) may be embodied in form of a software product. Such computer software product may be stored in a storage medium such as ROM/RAM, diskette, Compact Disc, or the like, and includes several instructions for causing a computer device (which may be a personal computer, a server, or a network device) to perform the method according to the various embodiments of the present disclosure or portions thereof.

In the above description, the same or similar portions between the various embodiments are not described in more detail, while the difference between these embodiments is emphasized.

The above described embodiments of the present disclosure should not be constructed as a limitation of the scope of the present disclosure. Any variations and modifications made without departing from the principle of the present disclosure should be encompassed by the scope of the present disclosure.

What is claimed is:

1. A data sharing method applicable in a first terminal, wherein the first terminal includes a first system and a second system which have a capability of operating a shared storage area directly accessible to each of the first and second systems, and the first and second systems having first and second hardware platforms, respectively, which can share hardware devices, the method comprising:
    starting, by the first system, transmitting a file in the shared storage area to a second terminal;
    detecting, by the first or second system, whether the first system fulfills a predetermined condition indicating or requiring stop of the file transmission by the first system, during the transmission of the file in the shared storage area to the second terminal by the first system; and
    in response to detecting that the first system fulfills the predetermined condition:
        acquiring, by the second system, upload information of the file comprising information about the file transmission by the first system; and
        switching to the second system, and continuing, by the second system, the transmission of the file to the second terminal in accordance with the upload information;
    wherein the first system is located within a first casing of the first terminal, and the second system and the shared storage area are located within a second casing of the first terminal; and
    wherein detecting that the first system fulfills the predetermined condition comprises: detecting, by the second system, a signal indicating that the first casing containing the first system is separated from the second casing.

2. The data sharing method of claim 1, wherein detecting that the first system fulfills the predetermined condition further comprises:
    detecting, by the first system, that only the operation of transmitting the file to the second terminal is currently performed; or
    detecting, by the second system, that the first system enters an inactive state; or
    detecting, by the first system, that a transmission fault occurs during the transmission of the file.

3. The data sharing method of claim 1, before transmitting the file in the shared storage area to the second terminal by the first system, further comprising:
    associating the first terminal with the second terminal by starting a sharing client software.

4. The data sharing method of claim 1, before transmitting the file in the shared storage area to the second terminal by the first system, further comprising:
    marking the file, by the first system, in accordance with a user-input sharing command; and
    saving the file and mark information into the shared storage area, wherein the mark information includes partition, catalogue, and file name of the file in the shared storage area as well as an identification of the second terminal.

5. The data sharing method of claim 4, wherein transmitting the file in the shared storage area to the second terminal by the first system comprises:
    reading, by the first system, the mark information in the shared storage area; and
    acquiring the file in accordance with the mark information, and transmitting the file to the second terminal in accordance with the identification of the second terminal.

6. The data sharing method of claim 1, when detecting that the first system fulfills the predetermined condition, further comprising:
    recording, by the first system, the upload information of the file into the shared storage area, wherein the upload information includes progress and amount of upload.

7. The data sharing method of claim 1, wherein the second terminal comprises a first system, a second system, and a shared storage area, the method further comprises:
    storing, by the first system, a received shared data into the shared storage area of the second terminal, when the first system of the second terminal is in an active state; and
    storing, by the second system, the received shared data into the shared storage area of the second terminal, when the first system of the second terminal exits the active state.

8. A first terminal comprising a first system and a second system which have capability of operating a shared storage area directly accessible to each of the first and second systems, wherein:
    the first and second systems have first and second hardware platforms, respectively, which can share hardware devices;
    the first system comprises a first transmission unit configured to transmit a file in the shared storage area to a second terminal;
    at least one of the first and second system comprises a detecting unit configured to detect whether the first system fulfills a predetermined condition indicating or requiring stop of the file transmission by the first system, during the transmission of the file in the shared storage area to the second terminal by the first system; and the second system further comprises an acquisition unit and a second transmission unit, wherein in response to the detecting unit detecting that the first system fulfills the predetermined condition, the acquisition unit acquires upload information of the file comprising information about the file transmission by the first system, and the second transmission unit continues the transmission of the file to the second terminal in accordance with the upload information;

wherein the first system is located within a first casing of the first terminal, and the second system and the shared storage area are located within a second casing of the first terminal; and wherein the detecting unit detects that the first system fulfills the predetermined condition by detecting a signal indicating that the first casing containing the first system is separated from the second casing.

9. The first terminal of claim 8, wherein the first system further comprises:
   a marking unit configured to mark the file in accordance with a sharing command user inputted; and
   a saving unit configured to save the file and mark information into the shared storage area, wherein the mark information includes the partition, catalogue, and file name of the file in the shared storage area as well as an identification of the second terminal.

10. The first terminal of claim 9, wherein the first transmission unit comprises:
    a mark reading unit configured to read the mark information in the shared storage area; and
    a file sending unit configured to acquire the file in accordance with the mark information, and transmit the file to the second terminal in accordance with the identification of the second terminal.

11. The first terminal of claim 8, wherein the first system further comprises a recording unit configured to record the upload information of the file into the shared storage area when the detecting unit detects that the first system fulfills the predetermined condition.

* * * * *